(12) United States Patent
Minamiguchi et al.

(10) Patent No.: US 8,165,006 B2
(45) Date of Patent: Apr. 24, 2012

(54) OPTICAL DISC DEVICE AND DATA REPRODUCTION METHOD FOR THE SAME

(75) Inventors: Shuichi Minamiguchi, Tokyo (JP);
Hajime Nishimura, Tokyo (JP);
Hiroharu Sakai, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/952,534

(22) Filed: Nov. 23, 2010

(65) Prior Publication Data

US 2011/0158063 A1 Jun. 30, 2011

(30) Foreign Application Priority Data

Dec. 25, 2009 (JP) ................................. 2009-294528

(51) Int. Cl.
*G11B 7/00* (2006.01)

(52) U.S. Cl. ..... 369/116; 369/94; 369/53.26; 369/44.32

(58) Field of Classification Search ................... 369/94, 369/116, 53.26, 59.11, 47.5, 44.32, 44.26
See application file for complete search history.

(56) References Cited

U.S. PATENT DOCUMENTS

| | | | |
|---|---|---|---|
| 2002/0145952 A1 | 10/2002 | Kono | |
| 2006/0067706 A1* | 3/2006 | Watabe | 398/182 |
| 2008/0025161 A1* | 1/2008 | Jeong | 369/44.11 |
| 2008/0089203 A1* | 4/2008 | Nishimura et al. | 369/53.23 |
| 2008/0253238 A1* | 10/2008 | Kaku et al. | 369/44.11 |
| 2008/0298193 A1 | 12/2008 | Matsuda | |
| 2009/0262624 A1* | 10/2009 | Fukuhara | 369/94 |
| 2010/0172230 A1* | 7/2010 | Furumiya | 369/116 |
| 2010/0226218 A1* | 9/2010 | Nakamura et al. | 369/47.5 |
| 2010/0232271 A1* | 9/2010 | Muto et al. | 369/47.19 |

FOREIGN PATENT DOCUMENTS

| | | |
|---|---|---|
| JP | 2001-176077 | 6/2001 |
| JP | 2006-228313 | 8/2006 |
| JP | 2008-84504 | 4/2008 |
| JP | 2008-299982 | 12/2008 |

* cited by examiner

*Primary Examiner* — Thang Tran
(74) *Attorney, Agent, or Firm* — Antonelli, Terry, Stout & Kraus, LLP.

(57) ABSTRACT

Prevention of deletion of data in an unintended recording layer of an optical disc is ensured even when servo deviation occurs while controlling data reproduction. A light source outputs a light beam with light intensity according to a driving current on which a high frequency signal is superimposed. The light beam is collected on a recording layer of an optical disc. As triggered by detection of servo deviation during data reproduction, a light intensity controller adjusts a superimposed amount of the high frequency signal in the driving current to suit to a specific recording layer with the lowest reproduction tolerance in the optical disc and thereby controls the light intensity of the light beam output from the light source.

7 Claims, 6 Drawing Sheets

| REPRODUCTION CONDITION | APC TARGET VALUE | HF VALUE |
|---|---|---|
| 1 | 1.1mW | 1.0mW |
| 2 | 1.2mW | 0.8mW |
| 3 | 1.2mW | 1.0mW |

OPTICAL DISC DEVICE AND DATA REPRODUCTION METHOD FOR THE SAME

CROSS REFERENCES

This application relates to and claims priority from Japanese Patent Application No. 2009-294528, filed on Dec. 25, 2009, the entire disclosure of which is incorporated herein by reference.

BACKGROUND

The invention relates to an optical disc device and a data reproduction method for the optical disc device. Particularly, the present invention is suited for use in an optical disc device for reproducing data which is recorded in an optical disc (multilayered optical disc) having multiple recording layers.

Recently, the storage capacity of a standardized optical disc has been improved by a so-called Multilayered Structure in which a plurality of recording layers are pasted together. For example, a multilayered Blu-ray disc having three or four layers have twice to 2.6 times as large storage capacity as that of a conventional Blu-ray having two layers.

Light sensitivity of each recording layer in a disc including a plurality of recording layers varies depending on differences in materials and structures. Therefore, data in each recording layer is reproduced with optimum reproduction power. If the light is collected on a recording layer with high light sensitivity using reproduction power for a recording layer with low light sensitivity, there is a possibility that the physical state of that recording layer may change and the recorded data may be destroyed due to the difference in the light sensitivity of the recording layers.

Even if a favorable reproduction condition is set to each layer in the conventional optical disc device, once servo deviation occurs, there is a possibility that a focal point may move to another recording layer which is different from a recording layer where the focal point is located, and data recorded in that other recording layer may be deleted unintentionally. As a countermeasure for that problem, the conventional optical disc device adopts a configuration that prevents data deletion by changing, for example, spherical aberration and reproduction power when the aforementioned servo deviation occurs (See Japanese Published Application No. 2008-299982).

SUMMARY

Although the light density that will have the influence as mentioned above can be changed to a certain degree with the conventional optical disc device, it has been impossible to promptly and significantly change the light density so as to satisfy practical specifications. Since the light density cannot be changed sufficiently as described above, if the aforementioned servo deviation occurs while controlling reproduction of data recorded in a certain recording layer, the conventional optical disc device has a problem of unintended deletion of data stored in another recording layer.

The present invention was devised in light of the circumstances described above. The present invention aims at suggesting an optical disc device that is capable of ensuring prevention of deletion of data in an unintended recording layer of an optical disc even upon the occurrence of servo deviation during data reproduction control and is thereby highly reliable; and a data reproduction method for the optical disc device.

In order to solve the above-described problem, an optical disc device according to an aspect of the present invention for at least reproducing data recorded in a multilayered optical disc configured of a plurality of multilayered recording layers includes: a light source for outputting a light beam with light intensity according to a driving current; a light intensity controller for supplying the driving current, on which a high frequency signal is superimposed, to the light source and controlling the light intensity of the light beam output from the light source; an objective lens for collecting the light beam on any one of the recording layers of the multilayered optical disc; a photodetector for receiving reflected light of the light beam from the multilayered optical disc; an error signal generator for generating an error signal based on the reflected light received by the photodetector; an actuator for moving the objective lens relative to the multilayered optical disc; and a controller for controlling the actuator based on the error signal, locating a focal point of the light beam on a recording layer of the multilayered optical disc, and controlling reproduction of data recorded in the recording layer; and wherein the light intensity controller includes: an automatic power control unit for controlling the driving current supplied to the light source based on the error signal; and a superimposed amount adjustor for adjusting a superimposed amount of the high frequency signal so as to suit to a specific recording layer with the lowest reproduction tolerance in the multilayered optical disc as triggered by detection of servo deviation based on the error signal while the controller controls data reproduction. The reproduction tolerance herein means difficulty in rewriting data in the recording layers and a recording layer with the lowest reproduction tolerance means a recording layer, from among the recording layers of an optical disc, whose data can be rewritten with a light beam with the lowest light intensity.

Also, a data reproduction method for an optical disc device according to another aspect of the present invention for at least reproducing data recorded in a multilayered optical disc configured of a plurality of multilayered recording layers, includes: an error signal generation step to supply a driving current, on which a high frequency signal is superimposed, to a light source, having an objective lens collect a light beam, which is output from the light source, on the multilayered disc, and generating an error signal based on reflected light of the light beam from the multilayered optical disc; a reproduction control step to drive an actuator based on the error signal, moving the objective lens relative to the multilayered optical disc, locating a focal point of the light beam on a recording layer of the multilayered optical disc, and controlling reproduction of data recorded in the recording layer; and a light intensity control step, as triggered by detection of servo deviation based on the error signal while controlling reproduction of the data, to adjust a superimposed amount of the high frequency signal so as to suit to a specific recording layer with the lowest reproduction tolerance in the multilayered optical disc and thereby controlling the light intensity of the light beam output from the light source.

According to the present invention, it is possible to realize an optical disc device that is capable of ensuring prevention of deletion of data in an unintended recording layer of an optical disc even upon the occurrence of servo deviation during data reproduction control and is thereby highly reliable; and a data reproduction method for the optical disc device.

DETAILED DESCRIPTION OF PREFERRED EMBODIMENTS

An embodiment of the present invention will be explained below with reference to the attached drawings.

Figure 1:
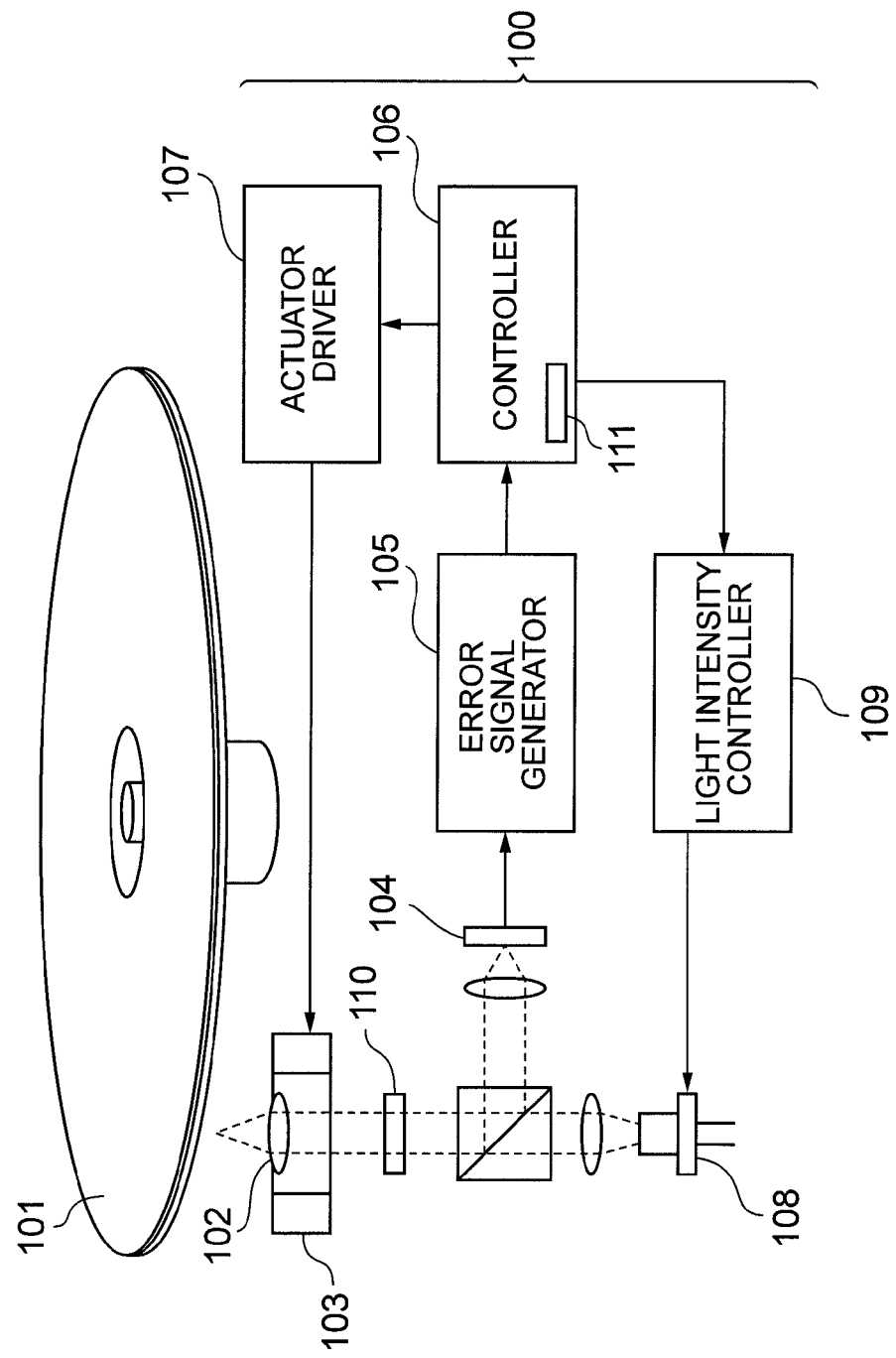
FIG. 1 is a block diagram showing a schematic configuration of an optical disc device, etc. according to the present embodiment.

(1) Schematic Configuration of Optical Disc Device According to the Present Embodiment (1-1) Schematic Configuration FIG. 1 shows a schematic configuration of an optical disc device 100 and an optical disc 101 according to the present embodiment. The optical disc 101 is a disc-shaped recording medium that can record and reproduce data and in which a plurality of recording layers are placed one over another. A light beam enters a recording surface of the optical disc 101 and data recorded in each recording layer is reproduced according to the light reflected from each recording layer.

The optical disc 101 has, for example, three recording layers formed therein. In the present embodiment, these three recording layers are called an L2 layer, an L1 layer, and an L0 layer in the order closer to a disc surface side of the optical disc 101. The optical disc 101 is configured so that data is read from the L0, L1, and L2 layers as described above in a state rotated by a spindle motor (not shown in the drawing).

The optical disc device 100 includes an objective lens 102, an actuator 103, a photodetector 104, an error signal generator 105, a controller 106, an actuator driver 107, a light source 108, a light intensity controller 109, an aberration correction mechanism 110, an aberration correction mechanism controller 111, and a power monitor (not shown in the drawing) serving as a light quantity measuring unit. The power monitor is provided near the light source 108 and measures the light quantity (power) of the light beam output from the light source 108.

The light source 108 outputs a light beam according to a driving current. The objective lens 102 collects the light beam output from the light source 108 and locates a focal point of that light beam on any one of recording layers of the optical disc 101. The actuator 103 moves the objective lens 102 in a vertical direction and a horizontal direction, independently from each other, relative to the surface of the optical disc 101. The photodetector 104 receives the light reflected from the optical disc 101.

The error signal generator 105 activates a servo (hereinafter sometimes simply referred to as the "servo signal") and generates an error signal indicating displacement between the focal point, which is formed on the optical disc 101, and the recording layer from a returned light detected by the photodetector 104. The error signal generator 105 has a focus error signal generator (not shown in the drawing) and a tracking error signal generator (not shown in the drawing).

The focus error signal generator has a function outputting a focus error signal by detecting relative displacement between the focal point of the light beam and the recording surface of the optical disc 101 according to the output from the light source 108. The tracking error signal generator has a function outputting a tracking error signal by detecting relative displacement between the focal point of the light beam and a track on the recording surface of the optical disc 101 according to the output from the light source 108. The actuator driver 107 generates a driving signal for driving the actuator 103 to move the objective lens 102 under the control of the controller 106.

The light intensity controller 109 controls the light intensity of the light beam output from the light source 108 by controlling the driving current supplied to the light source 108. This light intensity controller 109 superimposes a high frequency signal on the driving current and thereby makes the light beam output from the light source 108 enter a pulsed light emitting state. The details of this light intensity controller 109 will be explained later.

The aberration correction mechanism 110 is a mechanism for correcting an aberration of the focal point on the optical disc 101. The aberration correction mechanism controller 111 activates this aberration correction mechanism 110 and corrects the aberration of the objective lens 102.

(1-2) Configuration of Light Intensity Controller

Figure 2:
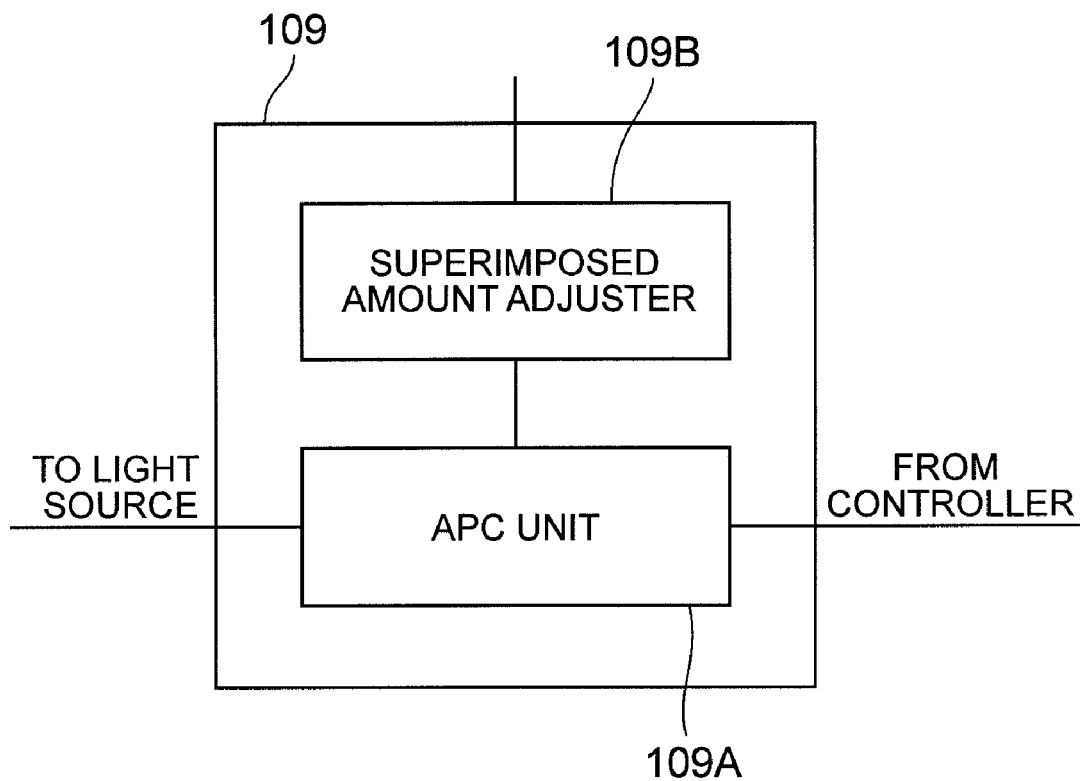
FIG. 2 is a block diagram showing a configuration example for a light intensity controller according to the present embodiment.

FIG. 2 shows a configuration example for the light intensity controller 109 according to the present embodiment. The light intensity controller 109 not only has the above-described function superimposing the high frequency signal on the driving current supplied to the light source 108, but also is configured as described below.

The light intensity controller 109 has an automatic power control unit 109A and a high frequency superimposed amount adjustor 109B. Incidentally, in the present embodiment, the automatic power control unit will be abbreviated as the "APC unit" and the high frequency superimposed amount adjustor will be abbreviated as the "HF superimposition adjustor," and the term "HF (High Frequency)" is used as a term indicating the high frequency.

The APC unit 109A controls the driving current supplied to the light source 108 so that it will become a specified target value, that is, an automatic power control target value (hereinafter referred to as the "APC target value"). In the present embodiment, three APC target values are prepared corresponding to the recording layers L0, L1, L2, respectively, according to the type of the optical disc 101.

Furthermore, the HF superimposed amount adjustor 109B superimposes a high frequency signal on this driving current and supplies that driving current to the light source 108, thereby making the light beam output from the light source 108 enter the pulsed light emitting state. In the present embodiment, three superimposed amounts of the high frequency signal are prepared according to the type of the optical disc 101 and the recording layers L0, L1, L2, respectively.

Under this circumstance, peak power of the light source 108 is equal to the sum of a power component represented by the aforementioned APC target value and a component of the high frequency signal. Under this circumstance, each recording layer L0, L1, L2 has different light sensitivity because of differences in materials and structures and the peak power of the light beam with the light sensitivity corresponding to each recording layer may sometimes affect destruction (or rewriting) of data in another recording layer.

The superimposed amount adjustor 109B has a function adjusting the superimposed amount of the high frequency signal superimposed on the driving current by the APC unit 109A. Also, the superimposed amount adjustor 109B may have a function adjusting the APC target value which is controlled as a target value by the APC unit 109A. The details about the superimposed amount adjustor 109B will be explained later.

Furthermore, the superimposed amount adjustor 109B may have a function adjusting both the HF superimposed amount and the APC target value. For example, the present embodiment will be explained as employing a form in which the superimposed amount adjustor 109B mainly adjusts both of the HF superimposed amount and the APC target value.

(1-3) Reproduction Conditions

Figures 3, 4:
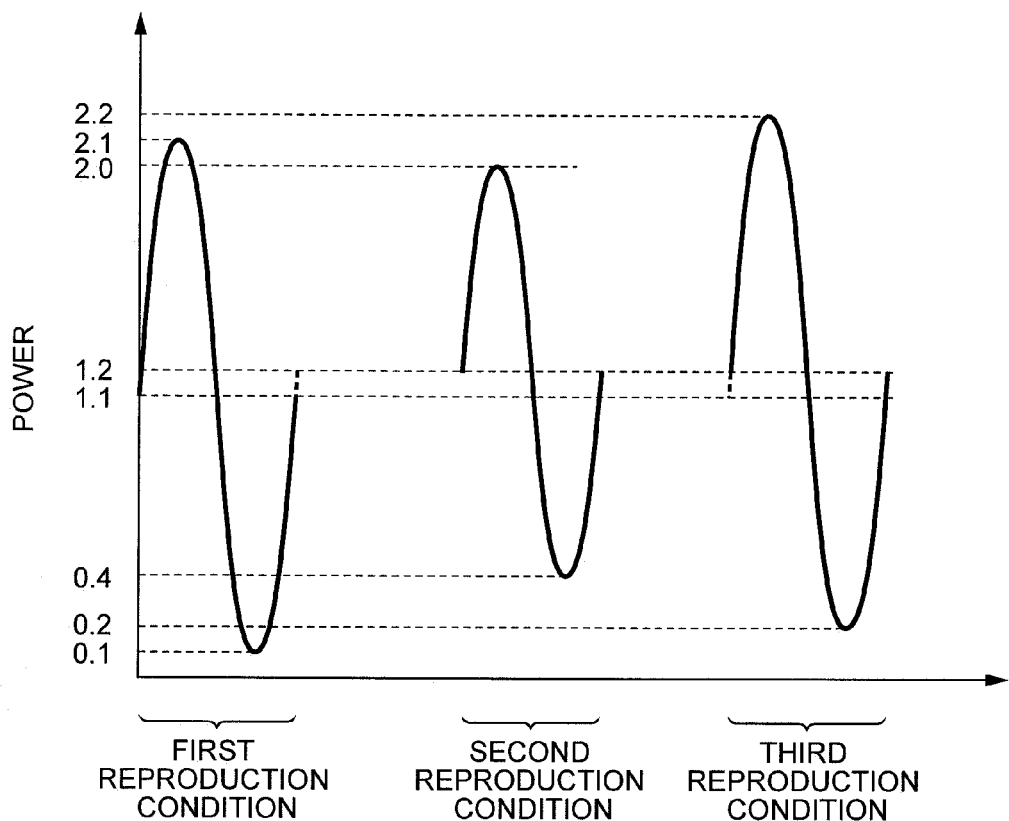
FIG. 3 shows an example of reproduction conditions according to the present embodiment.
FIG. 4 shows an example of a one-cycle waveform of reproduced light according to each reproduction condition.

FIG. 3 shows an example of reproduction conditions according to the present embodiment. Firstly, the reproduction conditions represent light beam power when reproducing data recorded in each recording layer of the optical disc 101. Incidentally, the light beam power is indicated using electric power [mW] in FIG. 3. A first reproduction condition, a second reproduction condition, and a third reproduction condition are prepared according to the aforementioned recording layers L0, L1, L2, respectively, as the above-described reproduction conditions in the present embodiment. Each reproduction condition includes the APC target value and the HF superimposed amount. Incidentally, specific numerical values are mentioned below, but they are merely examples to make the explanation easy to understand and the present embodiment is not limited to these numerical values.

The first reproduction condition is a reproduction condition for reproducing data recorded in the first recording layer L0. The first reproduction condition is that the APC target value is, for example, 1.2 mW and the HF superimposed amount is, for example, 1.0 mW. The second reproduction condition is a reproduction condition for reproducing data recorded in the second recording layer L1. The second reproduction condition is that the APC target value is, for example, 1.2 mW and the HF superimposed amount is, for example, 0.8 mW. The third reproduction condition is a condition for reproducing data recorded in the third recording layer L2. The third reproduction condition is that the APC target value is, for example, 1.1 mW and the HF superimposed amount is, for example, 1.0 mW. These numerical values will be examined as follows.

FIG. 4 shows an example of a one-cycle waveform of reproduced light for each reproduction condition. A waveform on the left side in FIG. 4 corresponds to the first reproduction condition, a waveform at the center corresponds to the second reproduction condition, and a waveform on the right side corresponds to the third reproduction condition. The maximum value of each reproduction condition in the example shown in the drawing is the "peak power" mentioned in the present embodiment.

The peak power of each reproduction condition regarding the above-mentioned example of the numerical values will be examined as follows. Firstly, the peak power of the first reproduction condition is 2.1 mW. The peak power of the second reproduction condition is 2.0 mW. The peak power of the third reproduction condition is 2.2 mW. Accordingly, in the above-described example, a recording layer with the lowest reproduction tolerance, that is a recording layer whose data can be rewritten most easily, is the second recording layer L1. In the present embodiment, the recording layer whose data can be rewritten most easily will be referred to as the "Lowest-Tolerance recording layer."

(1-4) Servo Deviation Detecting Configuration

Figure 5:
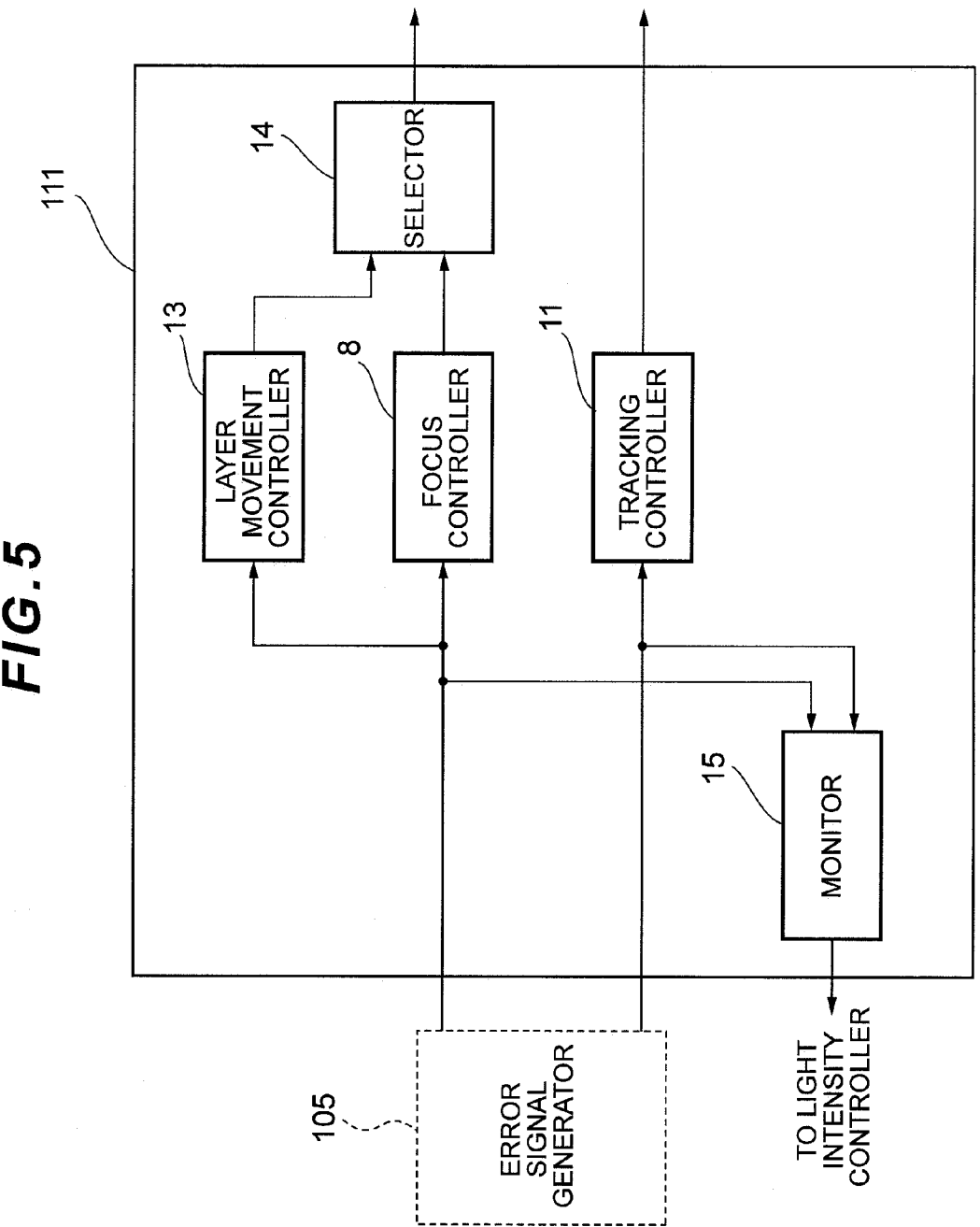
FIG. 5 is a block diagram showing a configuration example for a servo controller for detecting servo deviation.

FIG. 5 shows a configuration example for the servo controller 111 for mainly detecting servo deviation. Incidentally, the error signal generator 105 indicated with a dotted line is not part of the servo controller 111, but is shown in the drawing for the sake of explanation.

The servo controller 111 includes a focus controller 8 and a tracking controller 11. The focus controller 8 executes filtering processing such as phase compensation and low frequency compensation on the focus error signal from the focus error signal generator for the aforementioned error signal generator 105 and outputs the processing result to the actuator driver 107. On the other hand, the tracking controller 11 executes filtering processing such as phase compensation and low-pass compensation on the tracking error signal from the tracking error signal generator for the aforementioned error signal generator 105 and outputs, to the actuator driver 107, a control signal for making the focal point of the light beam follow the track on the optical disc 101.

A layer movement controller 13 has a function moving the focal point of the light beam from the currently following recording surface to a recording surface of another layer based on the entered focus error signal. A selector 14 has a function selecting output from either the focus controller 8 or the layer movement controller 13. A monitor 15 according to the present embodiment monitors any one of, or any combinations of, the total light quantity (PE) of the light source 108, the focusing error signal (FE), and the tracking error signal (TE) and detects so-called servo deviation. After the servo deviation is detected, the controller 111 outputs a signal indicating the servo deviation to the light intensity controller 109. Incidentally, it is a matter of course that the method for detecting the servo deviation is not limited to the above-described method and other methods may be used.

(2) Reproduction Operation of Optical Disc Device

As the optical disc device 100 is configured as described above, it performs the following reproduction operation.

(2-1) General Reproduction Operation

When controlling reproduction of data in the optical disc 101, the controller 106 controls the light intensity controller 109 to have the light source 108 output the light beam and have the light beam, which is collected via, for example, the objective lens 102, enter a recording surface of the optical disc 101. The light beam is reflected on the recording layer of the optical disc 101. The photodetector 104 receives a returned light of the reflected light beam. The error signal generator 105 generates an error signal based on the received returned light and the controller 106 generates a driving signal according to the error signal. The actuator driver 107 moves the position of the objective lens 102 by applying a voltage to the actuator 103 according to the driving signal, thereby correcting a focal point position. In this way, the focal point position is controlled by feeding back the positional displacement between the focal point and the recording layer to the positional control of the objective lens 102.

The controller 106 activates the actuator 103 by controlling the actuator driver 107 and locates the focal point of the light beam on a certain recording layer of the optical disc 101 and controls data reproduction recorded in that recording layer by moving the objective lens 102 in at least either a focus direction or a tracking direction. The APC unit 109A controls the driving current supplied to the light source 108 based on the error signal from the error signal generator 105.

(2-2) Processing for Dealing with Servo Deviation (HF Superimposed Amount Adjustment Processing)

Figure 6:
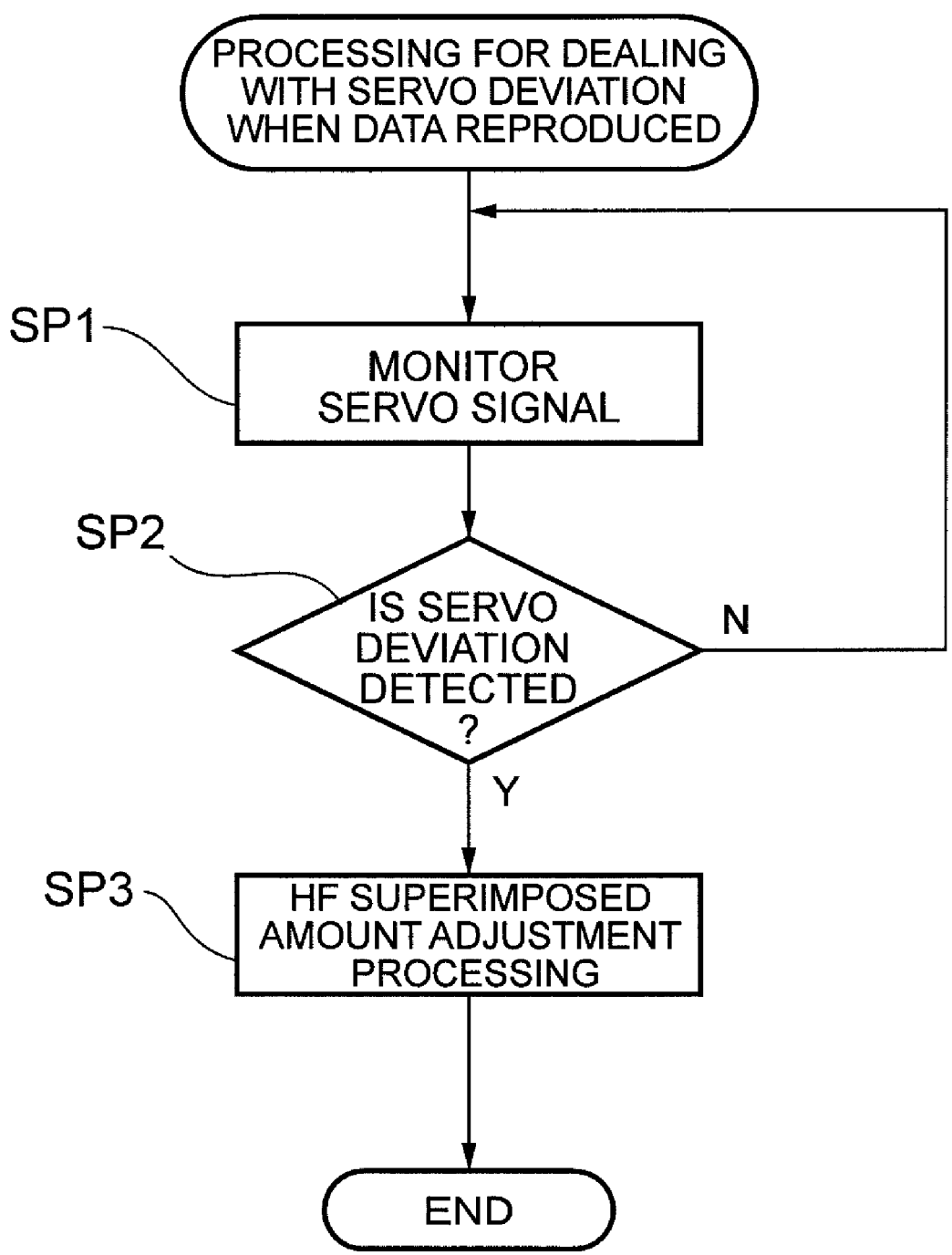
FIG. 6 is a flowchart illustrating an example of a reproduction method for the optical disc device according to the present embodiment.

FIG. 6 shows an example of processing for dealing with servo deviation at the time of data reproduction. Incidentally, the flowchart in FIG. 6 mainly illustrates part of the processing relating to the present embodiment.

The error signal generator 105 for the optical disc device 100 monitors a servo signal while reproducing data recorded in a certain recording layer of the optical disc 101 (SP1). Specifically speaking, the error signal generator 105 for the optical disc device 100 generates the focus error signal by detecting relative displacement between the focal point of the light beam and the recording surface of the optical disc 101. On the other hand, the error signal generator 105 generates the tracking error signal by detecting relative displacement between the focal point of the light beam and the track on the recording surface of the optical disc 101. The present embodiment will be explained by taking the tracking error signal as an example.

Next, the controller 106 detects so-called servo deviation based on the tracking error signal from the error signal generator 105 (SP2). As stated earlier, any one of various other methods may be used as the servo deviation detection method.

Subsequently, the controller 106 executes HF superimposed amount adjustment processing (SP3). In this HF superimposed amount adjustment processing, as triggered by detection of the occurrence of servo deviation based on the tracking error signal during the data reproduction control as described above, the superimposed amount adjustor 109B for the light intensity controller 109 adjusts the superimposed amount of the high frequency signal to suit to a specific recording layer with low reproduction tolerance in the optical disc 101 (hereinafter sometimes referred to as the "Lowest-Tolerance recording layer").

Specifically speaking, the superimposed amount adjustor 109B adjusts the superimposed amount of the high frequency signal so that the power of the light beam output from the light source 108 becomes less than recording power when recording data in the recording layer.

Furthermore, the light intensity controller 109 may also adjust the APC target value, together with the high frequency signal as mentioned above, to suit to the Lowest-Tolerance recording layer. Specifically speaking, the light intensity controller 109 adjusts both the high frequency signal and the APC target value as an example in the present embodiment.

(2-3) HF Recovery Processing

Figure 7:
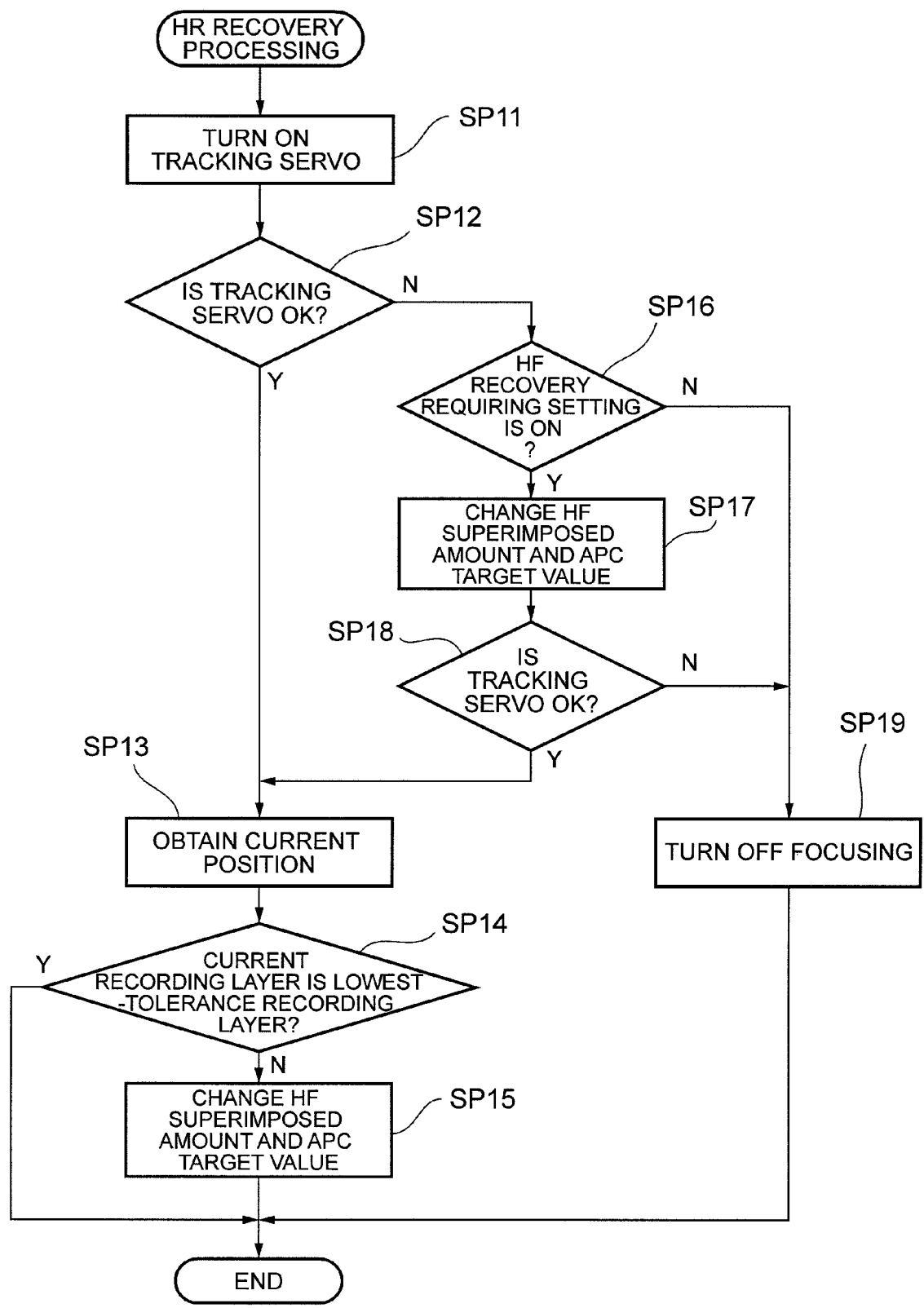
FIG. 7 is a flowchart illustrating an example of HF recovery processing.

FIG. 7 shows an example of a processing sequence for the HF recovery processing. The HF recovery processing includes a processing sequence for returning from the state where the servo deviation occurs as described above, to the state where there is no servo deviation.

In the HF recovery processing, the light intensity controller 109 specifies the recording layer of the optical disc 101 on which focus stays (hereinafter referred to as the "current recording layer"), based on the current position (address) of the focus after the occurrence of the servo deviation; and if the current recording layer is not the Lowest-Tolerance recording layer, the light intensity controller 109 resets the superimposed amount of the high frequency signal according to the current recording layer. In that case, the light intensity controller 109 may also reset the APC target value, together with the superimposed amount of the high frequency signal as mentioned above, according to the current recording layer. The following explanation will be given, assuming as an example that both the high frequency signal and the APC target value are to be changed.

The controller 106 causes the error signal generator 105 to turn on the tracking servo while keeping the setting of the HF superimposed amount after the servo deviation (SP11). The controller 106 judges whether the tracking servo is activated or not, based on the tracking error signal from the error signal generator 105 (SP12).

If the tracking servo is activated, the controller 106 obtains the current position of the focus after the occurrence of the servo deviation (SP13). In this step, the current position of the focus is obtained as an address indicating that position. Then, the controller 106 judges, based on the current position of the focus, whether the current position is the Lowest-Tolerance recording layer or not (SP14).

If the current position of the focus is the Lowest-Tolerance recording layer, the controller 106 terminates the HF recovery processing. Specifically speaking, the controller 106 regulates the above-described adjustment operation by the superimposed amount adjustor 109B. As a result, the HF superimposed amount and the APC target value are not changed. On the other hand, if the current position is not the Lowest-Tolerance recording layer, the controller 106 executes the above-described adjustment operation by the superimposed amount adjustor 109B and changes the HF superimposed amount and the APC target value to suit to the recording layer at the current position (SP15).

On the other hand, if the tracking servo is not activated in step SP12 described above, the controller 106 confirm the setting whether the execution of the HF recovery processing is required or not (SP16). When such confirmation is done, and if the servo deviation occurs, for example, in a case defocused and the adjustment by the superimposed amount adjustor 109B would take longer time, it is possible to temporarily stop focusing and have the light intensity controller 109 retry focusing from the beginning.

In case the setting the execution of the HF recovery processing is required, the controller 106 changes the HF superimposed amount and the APC target value (SP17). On the other hand, in case the setting the execution of the HF recovery processing is not required, the focusing is temporarily terminated (SP19).

Next, the controller 106 checks whether the tracking servo can be activated or not (SP18). If the tracking servo is activated, the controller 106 executes the processing from step SP13 again. If the tracking servo cannot be activated, the controller 106 temporarily terminates the focusing (SP19) and locates the objective lens 102 at a lower position because there is a possibility that the focus is currently placed in an area which is not the recording layer.

(3) Advantageous Effects of the Present Embodiment

The light intensity controller 109 for the optical disc device 100 according to the aforementioned embodiment includes the superimposed amount adjustor 109B as described above. As triggered by detection of the servo deviation based on the tracking error signal (or the focus error signal) during data reproduction control, the superimposed amount adjustor 109B adjusts the superimposed amount of the high frequency signal to suit to the Lowest-Tolerance recording layer of the optical disc 101.

With this arrangement and so-called servo deviation occurs during reproduction of data in a certain recording layer of the optical disc 101, the light intensity controller 109 adjusts the superimposed amount of the high frequency signal, thereby changing power supplied to the light source 108. Then, the pulsed light emitting state of the light beam output from the light source 108 changes and the peak power of a pulse reduces. Accordingly, when the servo deviation occurs, the focus is kept; and even if the light beam hits an unintended recording layer of the optical disc 101, the light density in that recording layer becomes equal to or less than power causing data destruction in that recording layer. As a result, even if the servo deviation occurs during data reproduction control, the optical disc device 100 can ensure that data in any unintended recording layer of the optical disc 101 will not be deleted; and it is possible to enhance reliability of the optical disc device 100.

The light intensity controller 109 for the optical disc device 100 has the automatic power control unit 109A for automatically controlling the driving current to the light source 108 according to the APC value. On the other hand, the superimposed amount adjustor 109B also adjusts the APC target value, together with the superimposed amount of the high frequency signal, to suit to the Lowest-Tolerance recording layer.

The superimposed amount adjustor 109B for the optical disc device 100 adjusts the superimposed amount of the high frequency signal so that the light quantity of the light beam output from the light source 108 becomes less than the power causing data destruction in the recording layer. An example of the power causing data destruction in the recording layer can include recording power when recording data in the recording layer.

With this arrangement, since the light quantity of the light beam is less than the power causing data destruction even when the servo deviation occurs, it is possible to prevent deletion of data recorded in any of the recording layers of the optical disc.

The light intensity controller 109 for the optical disc device 100 specifies the current recording layer of the optical disc 101 where the focus stays, based on the current position of the focus after the servo deviation occurs; and if the current recording layer is not the Lowest-Tolerance recording layer, the light intensity controller 109 resets the superimposed amount of the high frequency signal to suit to the current recording layer.

With this arrangement, the controller 106 can continue reproducing data from any one of the recording layers, on which the focal point of the light beam stays at that point in time, even after the aforementioned servo deviation occurs.

The light intensity controller 109 for the optical disc device 100 specifies the current recording layer of the optical disc 101 where the focus stays, based on the current position of the focus after the servo deviation occurs; and if the current recording layer is not the Lowest-Tolerance recording layer, the light intensity controller 109 resets the APC target value, together with the superimposed amount of the high frequency signal, to suit to the current recording layer.

With this arrangement, the controller 106 can continue reproducing data from any one of the recording layers, on which the focal point of the light beam stays at that point in time, even after the aforementioned servo deviation occurs.

With this arrangement, the focal point of the focus is placed on the Lowest-Tolerance recording layer due to any reason after the aforementioned servo deviation occurred, the controller 106 can prevent wasteful operation of the superimposed amount adjustor 109B and reproduce data from the Lowest-Tolerance recording layer.

(4) Other Embodiments

The above-described embodiment is an example given for the purpose of describing the present invention, and it is not intended to limit the invention only to the above-described embodiment. Accordingly, the present invention can be utilized in various ways unless the utilizations depart from the gist of the invention. For example, processing sequences of various programs have been explained sequentially in the embodiment described above; however, the order of the processing sequences is not particularly limited to that described above. Therefore, unless any conflicting processing result is obtained, the order of processing may be rearranged or concurrent operations may be performed.

In the HF recovery processing according to the aforementioned embodiment, the tracking servo may not sometimes be activated because at least either the total light quantity or the superimposed amount of the high frequency signal is inappropriate. Therefore, the superimposed amount adjustor 109B may change the total light quantity and the superimposed amount of the high frequency signal and then try to activate the tracking servo again. Also, it is not only made in the case where the tracking servo is not activated to change the total light quantity and the superimposed amount of the high frequency signal, but in a case where other means may be used to determine whether the above-described changes can be made or not in response to the determination result.

Furthermore, the aforementioned embodiment can have the same advantageous effect as described above by changing the frequency itself of the high frequency signal instead of changing the total light quantity and the superimposed amount of the high frequency signal.

Also, in the aforementioned embodiment, the HF superimposed amount adjustor 109B may remove the superimposition of the high frequency signal, that is, set a setting value of the superimposed amount of the high frequency signal to 0. In the aforementioned embodiment, it is only necessary for the superimposed amount of the high frequency signal adjusted by the HF superimposed amount adjustor 109B to be equal to or less than the setting value of the superimposed amount of the high frequency signal in the Lowest-Tolerance recording layer.

What is claimed is:

1. An optical disc device for at least reproducing data recorded in a multilayered optical disc configured of a plurality of multilayered recording layers, the optical disc device comprising:

a light source for outputting a light beam with light intensity according to a driving current;

a light intensity controller for supplying the driving current, on which a high frequency signal is superimposed, to the light source and controlling the light intensity of the light beam output from the light source;

an objective lens for collecting the light beam on any one of the recording layers of the multilayered optical disc;

a photodetector for receiving reflected light of the light beam from the multilayered optical disc;

an error signal generator for generating an error signal based on the reflected light received by the photodetector;

an actuator for moving the objective lens relative to the multilayered optical disc; and a controller for controlling the actuator based on the error signal, locating a focal point of the light beam on a recording layer of the multilayered optical disc, and controlling reproduction of data recorded in the recording layer; and wherein the light intensity controller includes:

an automatic power control unit for controlling the driving current supplied to the light source based on the error signal; and a superimposed amount adjustor for adjusting a superimposed amount of the high frequency signal so as to suit to a specific recording layer with the lowest reproduction tolerance in the multilayered optical disc as triggered by detection of servo deviation based on the error signal while the controller controls data reproduction.

2. The optical disc device according to claim 1,
wherein the light intensity controller has an automatic power control unit for automatically controlling the driving current for the light source in accordance with an automatic power control target value; and
wherein the superimposed amount adjustor adjusts, in addition to the superimposed amount of the high frequency signal, the automatic power control target value to suit to the specific recording layer.

3. The optical disc device according to claim 1,
wherein the superimposed amount adjustor adjusts the superimposed amount of the high frequency signal so that a light quantity of the light beam output from the light source becomes lower than power causing data destruction in the recording layer.

4. The optical disc device according to claim 2,
wherein the light intensity controller specifies a current recording layer in the multilayered optical disc, on which focus stays, based on a current position of the focus after the occurrence of the servo deviation; and if the current recording layer is not the specific recording layer, the light intensity controller resets the superimposed amount of the high frequency signal to suit to the current recording layer.

5. The optical disc device according to claim 4,
wherein the light intensity controller specifies the current recording layer in the multilayered optical disc, on which focus stays, based on the current position of the focus after the occurrence of the servo deviation; and if the current recording layer is not the specific recording layer, the light intensity controller resets the automatic power control target value, together with the superimposed amount of the high frequency signal, to suit to the current recording layer.

6. A data reproduction method for an optical disc device for at least reproducing data recorded in a multilayered optical disc configured of a plurality of multilayered recording layers placed, the data reproduction method comprising:
an error signal generation step to supply a driving current, on which a high frequency signal is superimposed, to a light source, having an objective lens collect a light beam, which is output from the light source, on the multilayered disc, and generating an error signal based on reflected light of the light beam from the multilayered optical disc;
a reproduction control step to drive an actuator based on the error signal, moving the objective lens relative to the multilayered optical disc, locating a focal point of the light beam on a recording layer of the multilayered optical disc, and controlling reproduction of data recorded in the recording layer; and
a light intensity control step, as triggered by detection of servo deviation based on the error signal while controlling reproduction of the data, to adjust a superimposed amount of the high frequency signal so as to suit to a specific recording layer with the lowest reproduction tolerance in the multilayered optical disc and thereby controlling the light intensity of the light beam output from the light source.

7. The data reproduction method for the optical disc device according to claim 6,
wherein in the light intensity control step, an automatic power control target value is also adjusted, together with the high frequency signal, to suit to the specific recording layer.

* * * * *